(12) United States Patent
Kaliski, Jr.

(10) Patent No.: US 9,202,079 B2
(45) Date of Patent: Dec. 1, 2015

(54) PRIVACY PRESERVING DATA QUERYING

(71) Applicant: VeriSign, Inc., Reston, VA (US)

(72) Inventor: Burton S. Kaliski, Jr., Vienna, VA (US)

(73) Assignee: VERISIGN, INC., Reston, VA (US)

(*) Notice: Subject to any disclaimer, the term of this patent is extended or adjusted under 35 U.S.C. 154(b) by 0 days.

(21) Appl. No.: 13/660,838

(22) Filed: Oct. 25, 2012

(65) Prior Publication Data

US 2014/0122476 A1 May 1, 2014

(51) Int. Cl.
*G06F 17/30* (2006.01)
*G06F 21/62* (2013.01)

(52) U.S. Cl.
CPC .................................. *G06F 21/6227* (2013.01)

(58) Field of Classification Search
None
See application file for complete search history.

(56) References Cited

U.S. PATENT DOCUMENTS

| | | | |
|---|---|---|---|
| 6,745,248 B1 | 6/2004 | Gardos et al. | |
| 6,895,430 B1 | 5/2005 | Schneider | |
| 6,901,436 B1 | 5/2005 | Schneider | |
| 6,973,505 B1 | 12/2005 | Schneider | |
| 7,188,138 B1 | 3/2007 | Schneider | |
| 7,194,552 B1 | 3/2007 | Schneider | |
| 7,409,406 B2 * | 8/2008 | Agrawal et al. | 707/742 |
| 7,558,970 B2 * | 7/2009 | Bellovin et al. | 713/193 |
| 7,565,402 B2 | 7/2009 | Schneider | |
| 7,698,425 B2 | 4/2010 | Thayer et al. | |
| 7,698,426 B2 | 4/2010 | Thayer et al. | |
| 7,707,039 B2 * | 4/2010 | King et al. | 705/1.1 |
| 7,711,727 B2 * | 5/2010 | Agrawal et al. | 707/711 |
| 7,742,953 B2 * | 6/2010 | King et al. | 705/26.1 |
| 7,823,207 B2 * | 10/2010 | Evenhaim | 726/26 |
| 7,979,711 B2 * | 7/2011 | Chen et al. | 713/176 |
| 8,037,168 B2 | 10/2011 | Schneider | |
| 8,117,339 B2 | 2/2012 | Adelman et al. | |
| 8,140,502 B2 * | 3/2012 | Francis et al. | 707/705 |
| 8,224,994 B1 | 7/2012 | Schneider | |
| RE43,690 E | 9/2012 | Schneider et al. | |
| 8,332,655 B2 * | 12/2012 | Gupta | 713/189 |
| 8,380,720 B2 * | 2/2013 | Chang et al. | 707/747 |
| 8,429,421 B2 * | 4/2013 | Chase et al. | 713/189 |

(Continued)

FOREIGN PATENT DOCUMENTS

| | | |
|---|---|---|
| JP | 2005167967 A | 6/2005 |
| WO | 9909726 | 2/1999 |
| WO | 0122286 | 3/2001 |

OTHER PUBLICATIONS

Chang et al, "Privacy Preserving Keyword Searched on Remote Encrypted Data", Division of Engineering and Applied Sciences, Harvard University, 2006.*

(Continued)

*Primary Examiner* — Hung Le
(74) *Attorney, Agent, or Firm* — MH2 Technology Law Group, LLP (57) ABSTRACT

A method, system, and computer-readable memory containing instructions include employing a tokenizing authority to obtain a tokenized query term that represents a query term, using the tokenized query term to perform a lookup against a tokenized term database, determining whether the tokenized query term exists in the database. The method, system, and computer-readable memory may further include returning an encryption or decryption key corresponding to an encrypted record of information associated with the query term and corresponding to the tokenized query term.

23 Claims, 8 Drawing Sheets

(56) References Cited

U.S. PATENT DOCUMENTS

| | | | |
|---|---|---|---|
| RE44,207 E | 5/2013 | Schneider | |
| 8,458,161 B2 | 6/2013 | Schneider | |
| 8,612,565 B2 | 12/2013 | Schneider | |
| 8,635,340 B1 | 1/2014 | Schneider | |
| 8,739,243 B1 | 5/2014 | Martini | |
| 8,874,932 B2* | 10/2014 | Gupta | 713/189 |
| 2004/0199520 A1 | 10/2004 | Ruiz et al. | |
| 2004/0199608 A1 | 10/2004 | Rechterman et al. | |
| 2005/0055327 A1* | 3/2005 | Agrawal et al. | 707/1 |
| 2005/0166046 A1* | 7/2005 | Bellovin et al. | 713/165 |
| 2005/0259817 A1* | 11/2005 | Ramzan et al. | 380/46 |
| 2005/0289084 A1 | 12/2005 | Thayer et al. | |
| 2007/0118884 A1 | 5/2007 | Ozaki et al. | |
| 2007/0208714 A1 | 9/2007 | Ture et al. | |
| 2007/0282796 A1* | 12/2007 | Evenhaim | 707/3 |
| 2008/0016233 A1 | 1/2008 | Schneider | |
| 2008/0059607 A1 | 3/2008 | Schneider | |
| 2008/0072039 A1* | 3/2008 | Relyea | 713/158 |
| 2008/0183703 A1* | 7/2008 | Agrawal et al. | 707/5 |
| 2008/0270418 A1 | 10/2008 | Chen et al. | |
| 2008/0313352 A1 | 12/2008 | Telesco | |
| 2009/0041253 A1* | 2/2009 | Chen et al. | 380/282 |
| 2009/0327296 A1* | 12/2009 | Francis et al. | 707/9 |
| 2010/0106980 A1* | 4/2010 | Kerschbaum et al. | 713/193 |
| 2010/0114964 A1* | 5/2010 | Kerschbaum et al. | 707/783 |
| 2010/0146299 A1* | 6/2010 | Swaminathan et al. | 713/189 |
| 2010/0153403 A1* | 6/2010 | Chang et al. | 707/747 |
| 2010/0153535 A1 | 6/2010 | Thayer et al. | |
| 2010/0198846 A1* | 8/2010 | Gupta | 707/757 |
| 2010/0269174 A1 | 10/2010 | Shelest | |
| 2010/0318546 A1* | 12/2010 | Kenthapadi et al. | 707/759 |
| 2010/0318782 A1* | 12/2010 | Auradkar et al. | 713/150 |
| 2011/0055248 A1 | 3/2011 | Consuegra et al. | |
| 2011/0145580 A1* | 6/2011 | Auradkar et al. | 713/170 |
| 2011/0296176 A1* | 12/2011 | Ashrafi et al. | 713/167 |
| 2012/0036114 A1* | 2/2012 | Kim | 707/700 |
| 2012/0159180 A1* | 6/2012 | Chase et al. | 713/183 |
| 2012/0330902 A1* | 12/2012 | Gupta | 707/691 |
| 2013/0104229 A1 | 4/2013 | Brennan, III | |
| 2013/0262852 A1* | 10/2013 | Roeder et al. | 713/150 |
| 2013/0339751 A1* | 12/2013 | Sun et al. | 713/189 |

OTHER PUBLICATIONS

Kumar et al, "On Anonymizing Query Logs via Token-based Hashing", 2007.*

Liu et al, "An Efficient Privacy Preserving Keyword Search Scheme in Clouding Computing", 2009 International Conference on Computational Science and Engineering, 2009.*

Boyens et al, "Using Online Services in Untrusted Environments: A Privacy-Preserving Architecture", 2003.*

Warwick Ford et al., "Server-Assisted Generation of a Strong Secret from a Password", In WETICE '00 Proceedings of the 9th IEEE International Workshops on Enabling Technologies: Infrastructure for Collaborative Enterprises, IEEE, 2000, 5 pages.

Unknown Author, RSA Tokenization Server, RSA, The Security Division of EMC, 2 pages http://www.rsa.com/services/pdfs/10160_TOKEN_DS_0410.pdf, accessed Dec. 2, 2011.

Unknown Author, Trademark Clearinghouse: Draft Implementation Model, ICANN, Apr. 13, 2012, 46 pages.

Anthony Ha, Facebook to Roll Out Email- and Phone Number-Based Ad Targeting Next Week, TechCrunch, Aug. 30, 2012, 2 pages.

Emiliano De Cristofaro et al., "Fast and Private Computation and Set Intersection Cardinality", IACR ePrint, Oct. 2, 2012, 14 pages.

Myungsun Kim et al., "Private Top-k Aggregation Protocols", IACR ePrint, updated Oct. 24, 2012, 15 pages.

Non-Final Office Action dated Sep. 22, 2014, U.S. Appl. No. 13/732,815, filed Jan. 2, 2013, pp. 1-36.

Steven M. Bellovin et al. "Privacy-Enhanced Searches Using Encrypted Bloom Filters," International Association for Cryptologic Research, vol. 20040201:185825, Feb. 1, 2004, pp. 1-12.

Dan Boneh et al. "Conjunctive, Subset, and Range Queries on Encrypted Data," Theory of Cryptography, Lecture Notes in Computer Science 4392, Feb. 21, 2007, pp. 535-554.

Annonymous, "Tokenization (data security)," Wikipedia, the free encyclopedia, http://en.wikipedia.org/w/index.php?title=Tokenization_(data_security)&oldid=517346331, Retrieved on Mar. 12, 2014, pp. 1-2.

Extended European Search Report dated Mar. 21, 2014 issued in European Application No. 13189842.1 filed Oct. 23, 2013, pp. 1-6.

Partial European Search Report dated Mar. 21, 2014 issued in European Application No. 13189843.9 filed Oct. 23, 2013, pp. 1-6.

Hannes Federrath et al., "Privacy-Preserving DNS: Analysis of Broadcast, Range Queries and Mixed-base Protection Methods", Computer Security—ESORICS 2011, Lecture Notes in Computer Science, vol. 6879, 2011, pp. 1-20.

Fangming Zhou et al., "Analysis of Privacy Disclosure in DNS Query", International Conference on Multimedia and Ubiquitous Engineering (MUE'07), 2007, pp. 1-6.

Final Office Action dated Jan. 20, 2015, U.S. Appl. No. 13/732,815, filed Jan. 2, 2013, pp. 1-42.

Extended European Search Report dated Jan. 23, 2015, European Application No. 13189843.9 filed Oct. 23, 2013, pp. 1-.

Non-Final Office Action dated May 22, 2015, U.S. Appl. No. 13/732,815, filed Jan. 2, 2013, pp. 1-19.

* cited by examiner

PRIVACY PRESERVING DATA QUERYING

TECHNICAL FIELD

This disclosure generally relates to techniques to provide private database querying. This application is related to copending U.S. application Ser. No. 13/732,815, filed Jan. 2, 2013 which is incorporated in its entirety herein by reference.

BACKGROUND

An owner of a database or data store of information may want to provide a mechanism to allow a requester to determine whether a piece of information is contained in the database without the requester having access to all of the owner's data and without the owner having knowledge of the content of the request. The privacy concern of the requester may be based on the sensitivity of the query, organizational goals, or privacy requirements encumbering the data.

For example, a requester may operate a web site that collects customer information, such as email addresses as a part of its normal operating procedure. The privacy terms of the web site may state that it will not share customer information. A database owner may collect and provide a database of email addresses of people who have previously shown interest in receiving a particular type of product information. The requester may want to compare its customer email addresses with the data owner's database to explore marketing opportunities for its customers, but according to the terms of the website, it cannot reveal the email addresses of its customers.

In one solution to this problem, the data owner may publish the database to a shared location or send the entire database to the requester. The requester may then run a query against the data store. One problem with this approach is that it may require the data owner to release its data store to a publishing point or to the requester. The data owner may prefer (or be under an obligation) that the data store remain private. Such a query may also still violate the terms under which the requester may release its customers' email addresses. Therefore, a mechanism is needed that can both preserve the privacy of the information sought and the privacy of the information held.

In addition, the data owner may wish to provide related data to the requester. In the example above, the data owner may also have collected demographic data associated with the email addresses. This additional data may be transmitted to the requester when the requested record is found in the database. But because the data request is private, a mechanism is needed to transmit the data to the requester without the data owner learning what information was requested. In addition, the data owner needs a way to maintain the privacy of the related data.

Therefore, a method and system is desired that can provide, as part of a query against a database, a way of preserving privacy during querying operation such that the requester only learns the specific information requested and the data owner does not learn the content of the request. The following disclosure solves these problems. As described in detail below, it is noted that this disclosure applies to all types of data requests and database types.

SUMMARY

A method, system, and computer-readable memory containing instructions for preserving privacy of a data query include receiving a request for information from a data set, wherein the request includes at least one tokenized query term, the query term having been previously tokenized; comparing the at least one tokenized query term to a store of tokenized query terms; and determining if the at least one tokenized query term is contained in the store of tokenized query terms.

In another embodiment, the query term is blinded prior to tokenization using a homomorphism function on the input space of the tokenizing function to produce a blinded input. The tokenized blinded input may then be unblinded to remove the blinding prior to submission to a tokenized data holder to determine whether the tokenized query term is contained in the store of tokenized query terms or to retrieve a decryption key corresponding to the query term.

In another embodiment, a tokenizing authority maintains the flow and control of the embodiments as they have been described herein. In another embodiment the requester submitting a query term for lookup maintains the flow and control of the embodiments as they have been described herein. In another embodiment a tokenized data holder maintains the flow and control of the embodiments as they have been described herein.

It is to be understood that both the foregoing general description and the following detailed description are not restrictive of the application, as claimed.

The accompanying drawings, which are incorporated in and constitute a part of this specification, illustrate embodiments of the application and together with the description, serve to explain the principles of the application.

DETAILED DESCRIPTION

Reference will now be made in detail to the example embodiments. Wherever possible, the same reference numbers will be used throughout the drawings to refer to the same or like parts. One skilled in the art will understand that the example concepts presented herein with reference to query terms (or data queries) and databases may be applied in the general sense to all data sets, query terms being one data set and a database being another data set.

Some embodiments use a tokenizing authority and a tokenizing function to find a list of common items between query terms and a database. A requester may wish to determine whether query terms appear in a data set. For example, a data source may employ a tokenizing authority to tokenize a data set of data items. The information requester may employ the tokenizing authority to tokenize a query term using the same tokenizing function. The tokenized query term may be compared with the tokenized data set to determine if the tokenized query term appears in the tokenized data set. This approach shields the requester's query term from the database owner. In some embodiments, the database of tokenized query terms may be maintained by a tokenized data holder.

Figure 1:
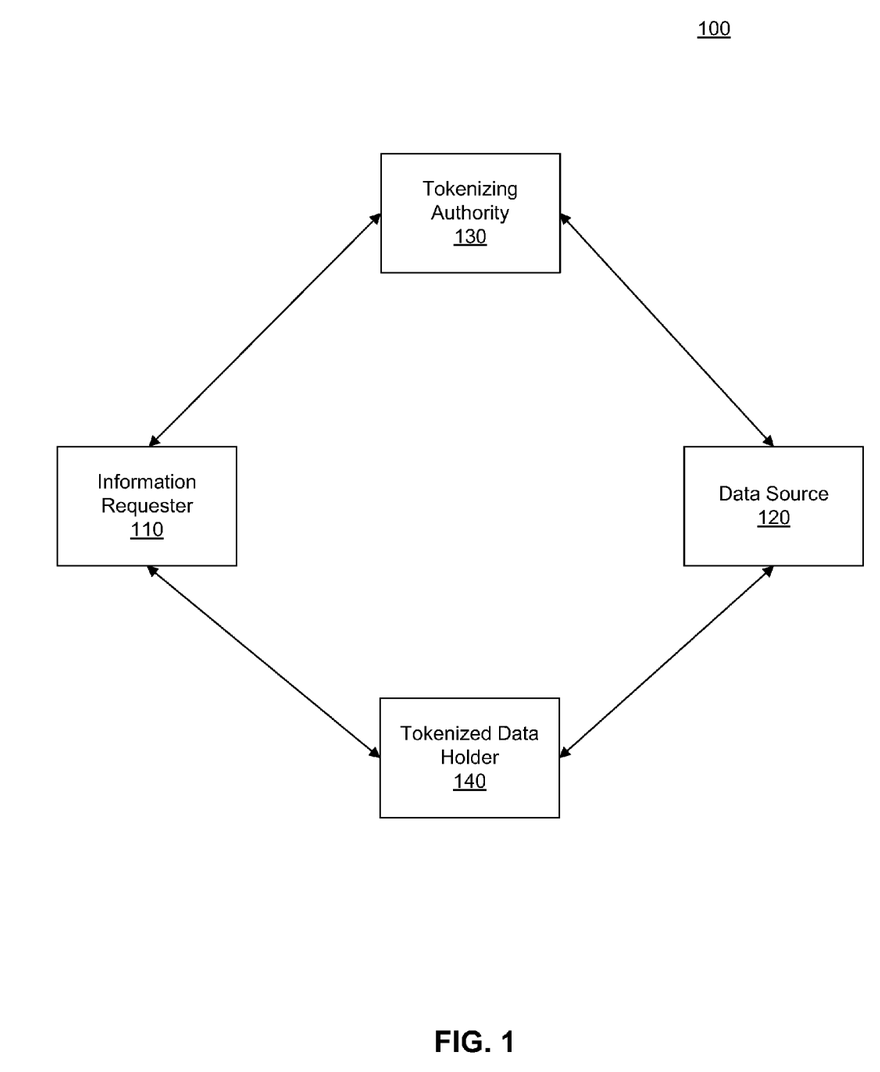
FIG. 1 illustrates the data flow and relationship definition of the four entities involved in a privacy preserving data query.

FIG. 1 illustrates the data flow and relationship definition of four functional entities involved in a privacy preserving query term lookup against a data set. The information requester (or requester) 110 presents a query term or plurality of query terms for comparison against a database. The information requester 110 may be an individual, corporation, electronic process, or any entity that requests information. An information requester 110 in the embodiments may have an interest in preserving the privacy of its query terms. Thus, rather than send its query terms to a data source 120 operator to compare the query term against the data source directly, the requester 110 may use a system consistent with this disclosure to hide the content of the request.

In some embodiments, the requester 110 may seek information corresponding to a query term. Such information may include whether the query term is found in the data source 120 and may include information related to the query term. For example, if the query term includes a phone number, related information may include a name and address corresponding to the phone number. Likewise, if the query term includes a domain name, related information may include a Domain Name System (DNS) record corresponding to the domain name, which may include an IP address. Discussion of specific examples of such embodiments will be described in further detail below.

A tokenizing authority 130 may interact with each of the information requester 110 or data source 120 operator throughout a privacy preserved data request transaction (or "lookup"). The tokenizing authority 130 enables the information requester 110 or data source 120 to obtain tokenized data corresponding to the query term of interest or data source elements, based on one or more tokenizing functions. In some embodiments, one-way tokenizing functions are used. Such functions receive a string of characters (or binary input) or data terms as input and return a tokenized string of characters (or tokenized binary output) or tokenized data terms based on the tokenizing function(s). The function(s) may be modified or reseeded as needed to help protect against reverse engineering and decrypting tokenized strings.

In some embodiments, the tokenizing authority 130 may tokenize data from a data source 120 and provide it to a tokenized data holder 140. The tokenized data holder 140 may receive the tokenized data from the tokenizing authority 130 directly or through the data source 120 operator. The tokenized data holder 140 may respond to the data term queries by the information requester 110. In some embodiments, the tokenizing authority 130 may be implemented by the data source 120 operator and may share hardware resources to implement the tokenizing functionality. In particular, this may be the case when a blinding function is used to keep the query term private from the tokenizing authority 130, which is discussed further below. In some embodiments the tokenized list holder 140 may be implemented by the same operator as the tokenizing authority 130 and share hardware resources. One of ordinary skill in the art will understand that the functional entities requester 110, data source 120, tokenizing authority 130, and tokenized data holder 140, may be operated across multiple different physical machines.

The tokenizing authority 130 may be implemented in software as software modules or programs on one or more computing systems. For example, the functionality of the tokenizing authority 130 may comprise one or more applications, which may comprise computer-readable instructions which, when executed by a processor, cause one or more computers to perform steps of a method. In particular, the example architecture in FIG. 1 may support execution of program code on one or more computers to accomplish the overall system and method. Computer-readable instructions may be stored on a computer-readable medium, without limitation such as a memory or disk. Such media typically provide non-transitory storage. One or more of the components depicted in FIG. 1 may be hardware components or combinations of hardware and software such as, for example, special purpose computers or general purpose computers. A computer or computer system may also comprise an internal or external database. The database may comprise one or more individual databases or databases configured to act together. The database may be implemented in a commercial, open source, or proprietary database program or may be contained in log files, flat files, or any other data storage mechanism. The database may alternatively be referred to as a store, set, source, or list. The components of a computer or computer system may, among other things, connect through a local bus interface or over a local or wide area network. The components depicted in FIG. 1 may be operatively connected to one another via a network, not shown, such as the Internet, an intranet, or any type of wired or wireless communication system. Connections may be implemented through a direct communication link, a local area network (LAN), a wide area network (WAN), and/or other suitable connections.

Figure 2:
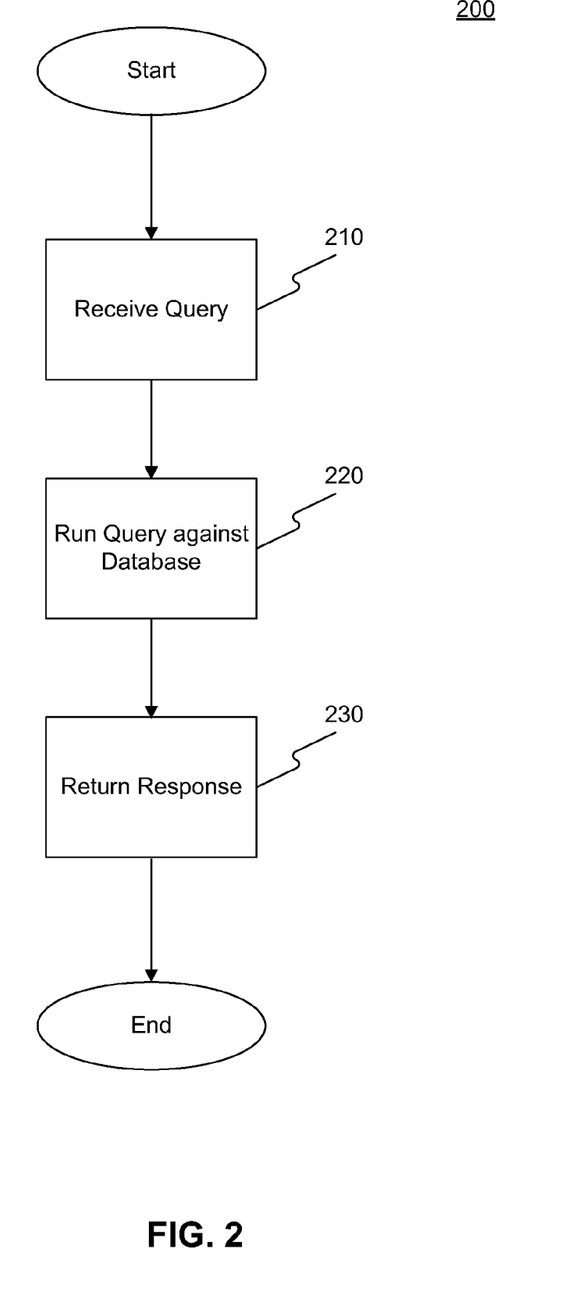
FIG. 2 illustrates an example process of responding to a data query.

FIG. 2 illustrates an example process 200 of responding to a data query. In step 210, the data source 120 owner may receive a data request (query) from a requester 110. In step 220, the data source 120 owner may look up the query term in its data source 120 by, for example, executing a Structured Query Language (SQL) statement. In step 230, the data source owner 120 may return the results of the lookup to the requester 110, indicating whether the query term was found in the data set. One skilled in the art will understand that, in the case where the query term includes multiple query terms, the lookups may be performed concurrently through parallel processes, sequentially, or a combination of the two.

Figure 3:
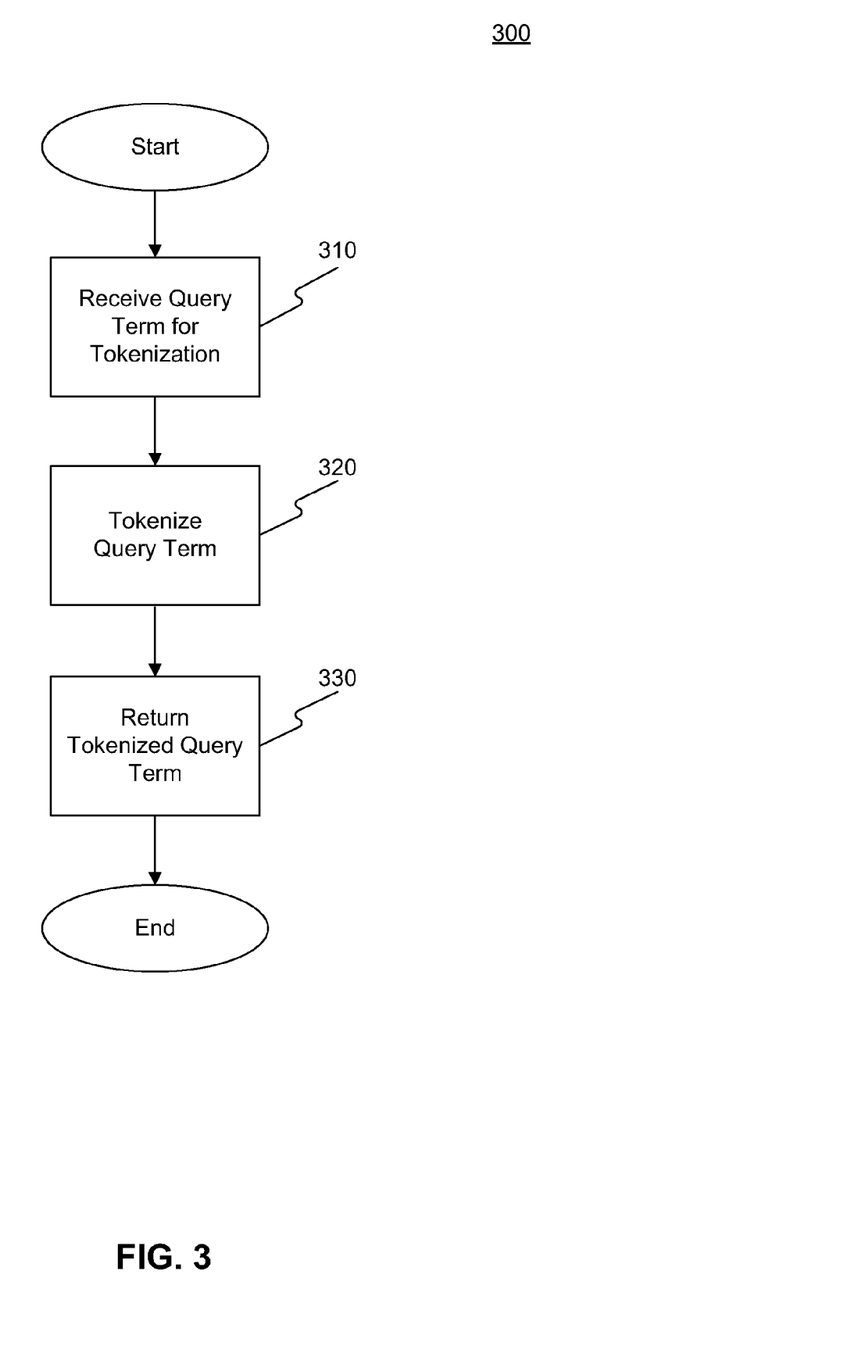
FIG. 3 illustrates an example process that expands upon the example process of FIG. 2 using privacy preserving techniques.

FIG. 3 illustrates an example process 300 that may be executed by the tokenizing authority 130 to tokenize a requester's query term (or set of query terms) or a data source 120 operator's data set. For example, the process 300 may be executed by the tokenizing authority 130 upon receiving a query term from an information requester 110. In step 310, the tokenizing authority 130 may receive the query term for tokenization. In the case where the tokenizing authority 130 will provide a tokenized version of a query term for a requester, the query term will be received from the requester. In the case where the tokenizing authority 130 will provide a tokenized version of the query term existing in a data source 120, the query term will be received from a data source operator. In either case, the tokenizing authority 130 may be configured to receive multiple query terms at once through batch processing.

In step 320, the tokenizing authority 130 may tokenize the query term (or set of query terms) by applying a tokenizing function to the query term. In some embodiments the tokenizing function may be a one-way tokenizing function and in some embodiments the tokenizing function may be a reversible tokenizing function. The tokenizing function produces an alternative representation of the query term, for instance, with a keyed hash function or other cryptographic computation. In step 330, the tokenizing authority 130 returns the tokenized query terms to the requester 110, the data source 120 operator, or the tokenized data holder 140. If tokenizing multiple query terms in a batch process, the tokenizing authority 130 may preserve the order for the convenience of the requester or may mix up the order so that the data source owner may not be able to associate the tokenized query terms with their submitted untokenized counterparts (such as when the data source owner is also the tokenized data holder). In some embodiments, the requester 110 (or the data source 120 operator) may pre-process the data query before interacting with the tokenizing authority 130. For instance, the requester 110 (or the data source 120 operator) may apply a cryptographic operation to the query term and send the result rather than the query term as input to the tokenizing authority 130. The tokenizing authority would apply the tokenizing function to the input. In other embodiments, the requester 110 (or the data source 120 operator) may post-process the output received from the tokenizing authority to obtain the actual tokenized query term. For instance, the requester 100 (or the data source 120 operator) may apply a cryptographic operation to the output received from the tokenizing authority, and employ the result as the tokenized query term. Some embodiments may employ a combination of both pre- and post-processing. One skilled in the art will understand that pre- and post-processing may involve multiple pre- and post-processing functions.

Figure 4:
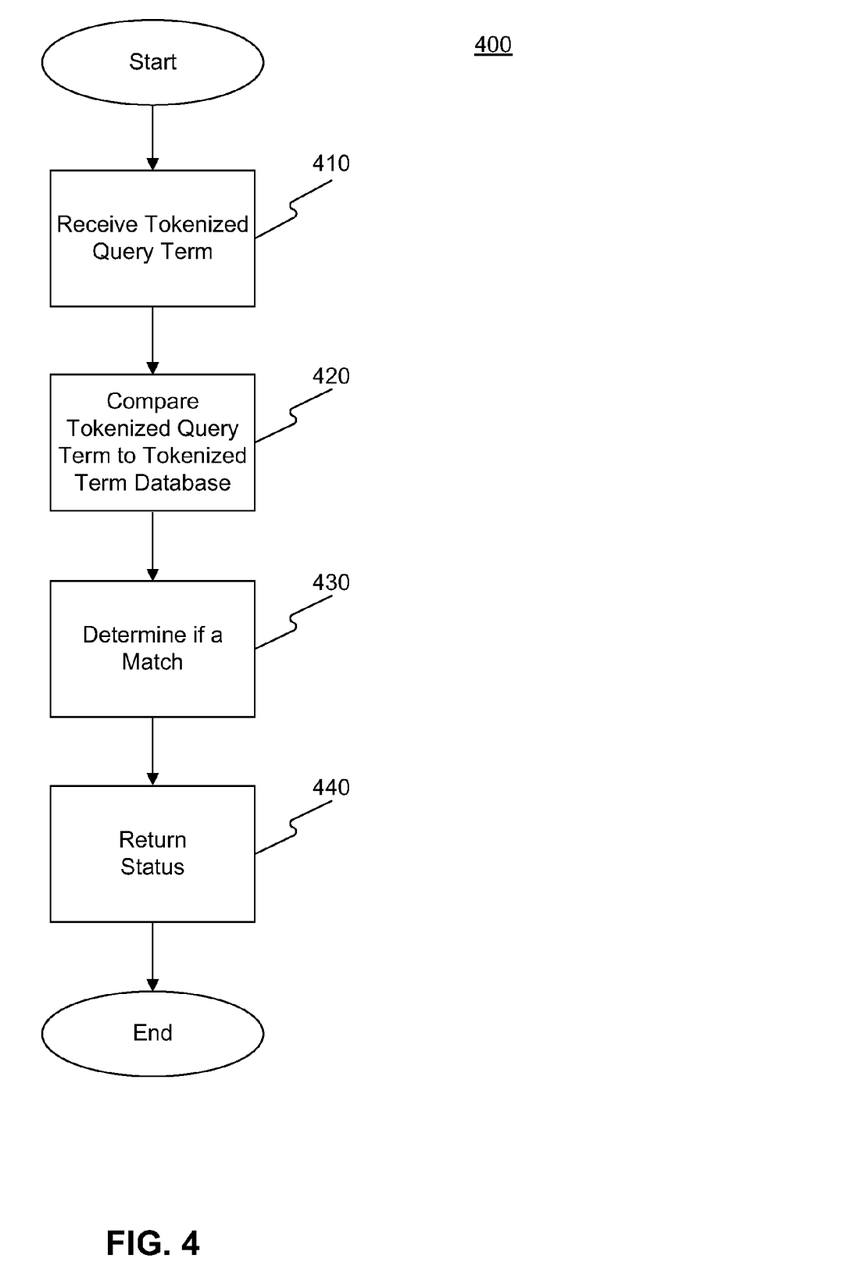
FIG. 4 illustrates an example process to determine whether a tokenized query term exists in a tokenized term database.

FIG. 4 illustrates an example process 400 of determining whether a query term exists in a database while preserving privacy of the query term by comparing a tokenized query term to a tokenized term database. In one embodiment, an information requester 110 may submit a tokenized query term, as received from step 330, to a data source operator that supports privacy preserving querying through tokenized query terms. In another embodiment the requester 110 may submit the tokenized query term to a tokenized data holder 140 who maintains a tokenized term database. The tokenized term database contains query terms that were tokenized with an equivalent tokenizing function as the tokenizing function used on the input data corresponding to the query term as in step 330. The tokenizing functions need not be identical, but just have an equivalent effect such that for those input values of interest in a particular embodiment, the tokenized value is the same. For example, given two tokenizing functions, T1 and T2, and any input k taken from a set of input values of interest, T1(k)=T2(k). Thus, T1 may equal T2, or not, depending on the implementation. In step 410, the data source 120 operator or tokenized data holder 140 (depending on the embodiment) may receive the tokenized query term (or query terms). In step 420, the tokenized query term may be compared to the tokenized term database. Step 430 may determine whether a match occurs between the tokenized query term and the tokenized term database. In step 440, the status of the matching process is provided to the requester.

The example process 400 preserves privacy of the query term from the data source operator, but still requires the tokenizing authority to be trusted by the information requester. Even so, it significantly reduces the risk that the query term may be revealed in the data querying process.

In the embodiments described above, the tokenizing authority may be a trusted agent in the cases where the query term may be revealed to the tokenizing authority to obtain the tokenized query term. In another embodiment, the tokenizing authority does not learn the query term. As one type of pre- and post-processing, prior to sending the query term to the tokenizing authority, the requester may blind the query term by encoding it to another input using an appropriate homomorphism function on the input space of the tokenizing function. The tokenizing authority then applies the tokenizing function to the modified input, returning the result as in process 300. Because the blinding function is a homomorphism relative to the tokenizing function, the inverse unblinding function may be applied as a post-processing function on the result to obtain the tokenized version of the query term that would have been obtained without blinding. A database of tokenized data items from the data store may be generated by the tokenizing authority, optionally using a similar technique. The requester may then use the tokenized query term as in process 400 to determine if a match occurs between the tokenized query term and the tokenized term database. Using a blinding function preserves the privacy of the query term, both from the requester's perspective and optionally from the data store operator's perspective.

Figure 5:
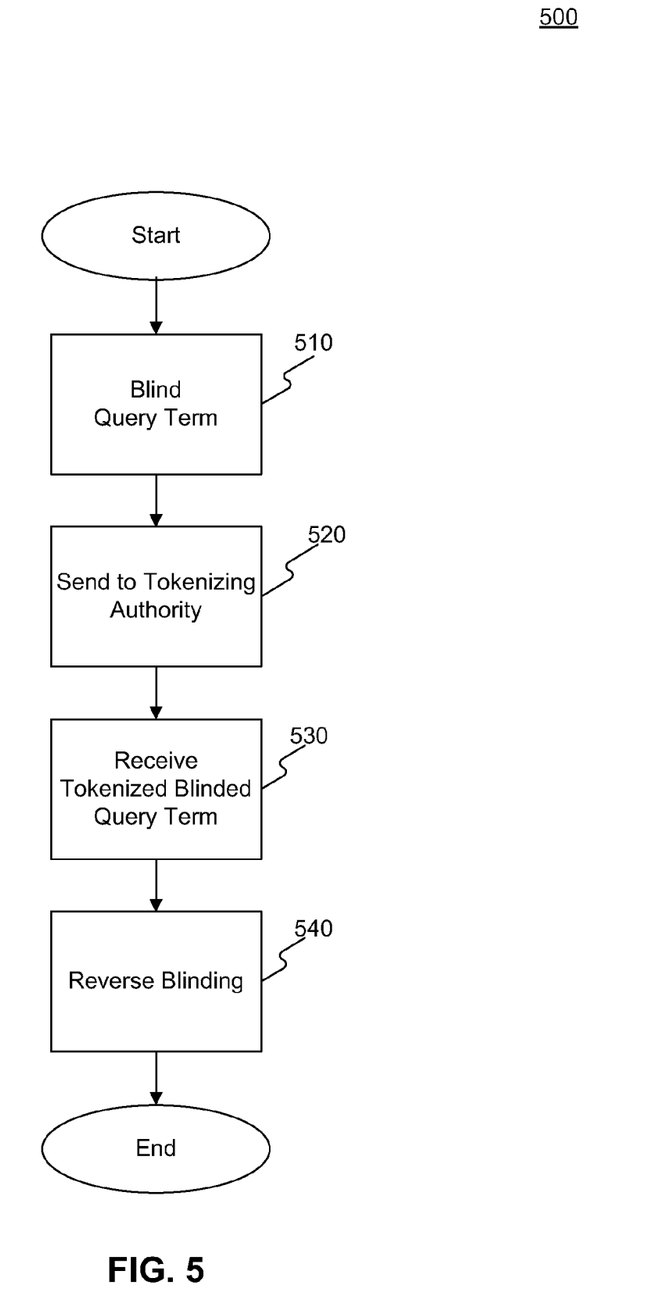
FIG. 5 illustrates an example process of performing a blinding function on the query term of interest prior to tokenization.

FIG. 5 illustrates an example process 500 of performing blinded tokenization on a query term (or terms) of interest from the perspective of the information requester 110 or data source 120 operator. In step 510, the requester 110 or data source 120 operator may blind the query term or terms. The blinding function may be a homomorphism of the tokenizing function used by the tokenizing authority. That is, it must be reversible after tokenization has occurred to reveal the tokenized query term. The blinding function may be seeded with a random number to prevent the tokenizing authority from reverse engineering the query term. As described in connection with FIG. 3, the requester 110 or data source operator may further pre-process the data query before blinding it.

In step 520, the blinded input representing the query term is sent to the tokenizing authority. Once the tokenizing authority has applied the tokenizing function to the blinded input, it may return the tokenized result back to the requester or data source operator, as in step 530. In step 540, the requester may reverse the blinding function and optionally post-process the result to complete the computation of the tokenized query term. The tokenized query term may then be submitted by the requester or data source operator to the tokenized data holder 140 as in process 400, above. From the perspective of the tokenizing authority 130, tokenizing a blinded input may be no different than tokenizing a non-blinded input string in the basic process 300 found in FIG. 3.

Blinding techniques for digital signatures are well established in the art. In a typical blind signature technique, a first party, Alice, obtains the signature of a second party, Bob, on a message m via the following or similar steps. Alice first computes a blinded version m' of the message m, and sends m' to Bob. Bob then computes a signature s' on the message m using Bob's signature function, and returns s' to Alice. Alice then unblinds s' to recover s, the actual signature on m. One example of such a technique involves the RSA signature scheme, where Bob's signature function is $m'=(s')^d \mod n$ where (n,d) is Bob's RSA private key. Alice obtains Bob's RSA public key (n,e). An appropriate blinding function in this case is for Alice to compute $m'=mr^e \mod n$ where r is a random value between 0 and n−1. The signature s' can be unblinded by Alice by computing $s=s' r^{-1} \mod n$. (The well-known proof that unblinding reverses blinding is given by expanding the formulas: $s=s' r^{-1}=(m')^d r^{-1}=m^d r^{ed} r^{-1}=m^d \mod n$.)

A blinding technique based on the RSA signature scheme may be employed in the present application as follows. First, the requester or data source operator applies a cryptographic hash function to the query term to map it to a message m between 0 and n−1. Second, the requester or data source operator blinds the message m, computing m' as above, and sends m' to the tokenizing authority. Third, the tokenizing authority computes the signature s' on the blinded input m', and return s' as the blinded output. Fourth, the requester or data source operator unblinds the blinded output s', obtaining the actual signature s as above. Fifth, the requester or data source operator applies a cryptographic hash function to the signature s (and possibly other inputs) to map it to a tokenized query term. Thus, one embodiment may have m=$H_1$(query term) where $H_1$ is a first hash function and tokenized query term $H_2$(s) where $H_2$ is a second (optionally distinct) hash function.

In addition to mapping to an integer in the appropriate range, the first cryptographic hash function also helps ensure that non-matching query terms are unlikely to produce matching tokenized query terms due to "collisions" in the tokenization process, such as when two distinct inputs produce the same (or similar) output over the portion of the tokenized output used for comparison.

The second cryptographic hash function helps ensure that it is hard for another party to determine whether a tokenized query term corresponds to a given query term without consulting the tokenizing authority at some point.

Note also that because the RSA signature scheme is deterministic (same input m produces same output s), the tokenizing function defined here will also be deterministic. This is important to ensure that matching query terms always produce matching tokenized query terms.

Other blinding techniques with similar properties to the RSA signature scheme with associated blinding and unblinding functions may also be employed in the tokenization process within the scope of the disclosure and the embodiments presented herein. In particular, the RSA signature scheme as described above may be altered by employing a different or, depending on the format of the query term, no function in the cryptographic first step, and a different or no function in the cryptographic fifth step.

Finally, note also that for the purposes of the disclosure, it is not necessary that the tokenizing process be reversible. That is, even the tokenizing authority need not be able to recover the query term from the tokenized query term. The tokenizing process only needs to be able to map query terms forward to tokenized query terms, which can then be compared while preserving the privacy of the query terms themselves.

Figure 6:
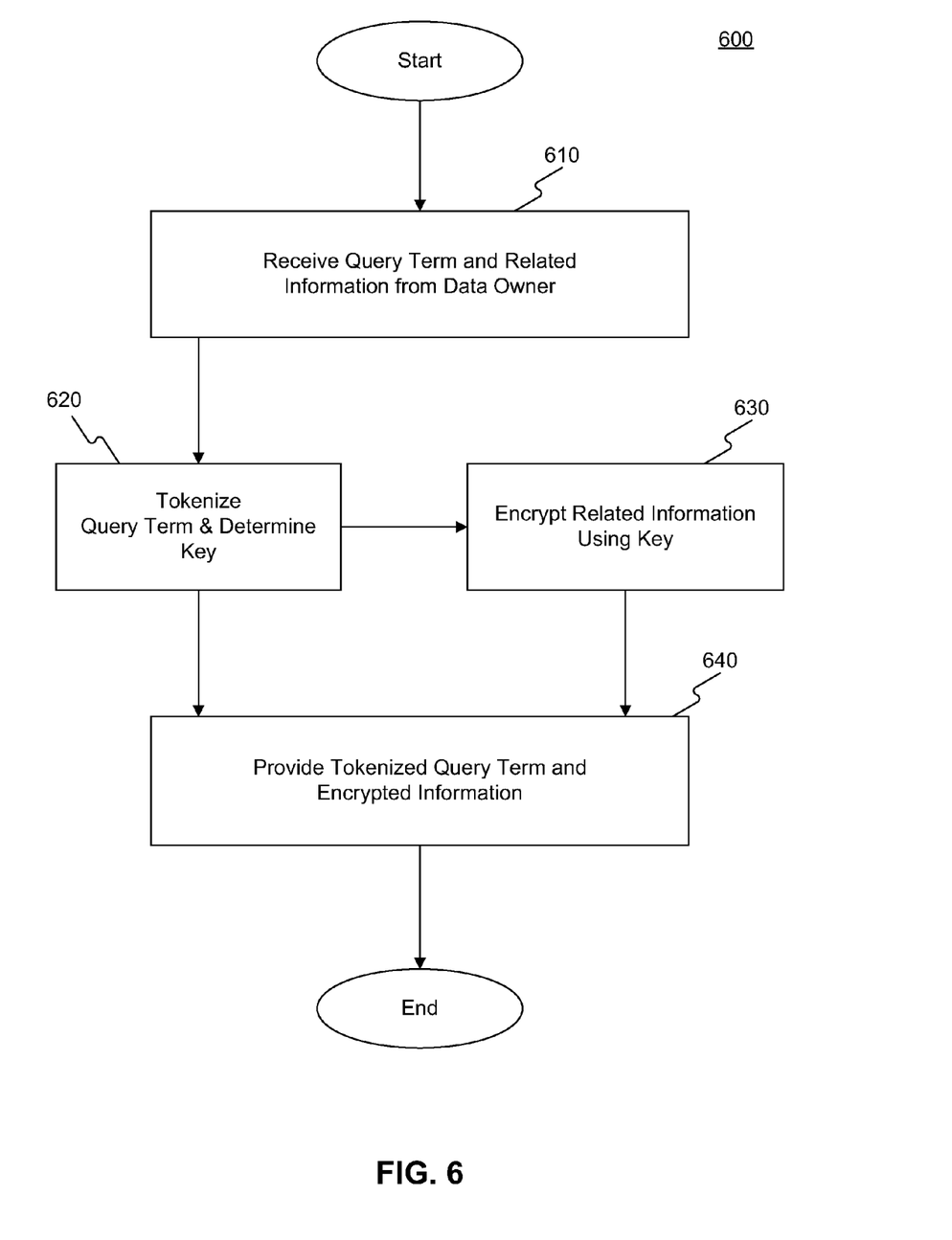
FIG. 6 illustrates an example process that receives a query term and information related to the query term, creates a key, and encrypts the information related to the query term.

FIG. 6 illustrates an example process 600 that receives a query term and an associated query term record related to the query term and processes the received data so that some or all of the query term information may be available in an encrypted format. The associated query term record may be considered metadata to the query term, that is, data related to the query term by its logical or associative relation in the data source 120. In embodiments where the metadata is encrypted, requesters are unable to recover the metadata without first obtaining a corresponding decryption key. In step 610, the tokenizing authority 130 may receive a query term and corresponding query term information from the data source 120.

The query term is tokenized in step 620. Also in step 620, an encryption key is generated from the query term for use in encrypting the related query term information (such as an associated query term record). The encryption key may be determined as part of the tokenization process. For example, the tokenization process may generate a tokenized query term that is initially unnecessarily long. The tokenizing authority may apply the tokenizing function and designate part of the output as the tokenized query term and part of the output as the encryption key. In other embodiments, the tokenizing authority may apply one or more key generating functions to determine one or more encryption keys based on the query term. In other embodiments, the data source 120 may derive or calculate the encryption key from the output returned by the tokenizing authority as part of post-processing. In other embodiments, the data source 120 owner may interact with a different tokenizing authority or a different server to determine the encryption key corresponding to the query term. In step 630, the encryption key is used to encrypt the related query term information. In some embodiments, multiple keys may be calculated in step 620 and used in step 630 to encrypt different parts of the related query term information. For example, one key may be used to encrypt part(s) of the related query term information, another key may be used to encrypt other part(s) of the related query term information, and some of the related query term information may remain unencrypted. The tokenized query term and encrypted related query term information are provided to the tokenized data holder 140 in step 640.

If the data source owner is also the tokenized data holder, and the process 600 is performed in bulk, the returned data set (including the tokenized query term and encrypted related query term information for each submitted query term) may be returned in an order different from which it was received. Reordering may help prevent the data source 120 operator from determining which tokenized query term corresponded to which query term or determining which encrypted record corresponded to which query term.

Figure 7:
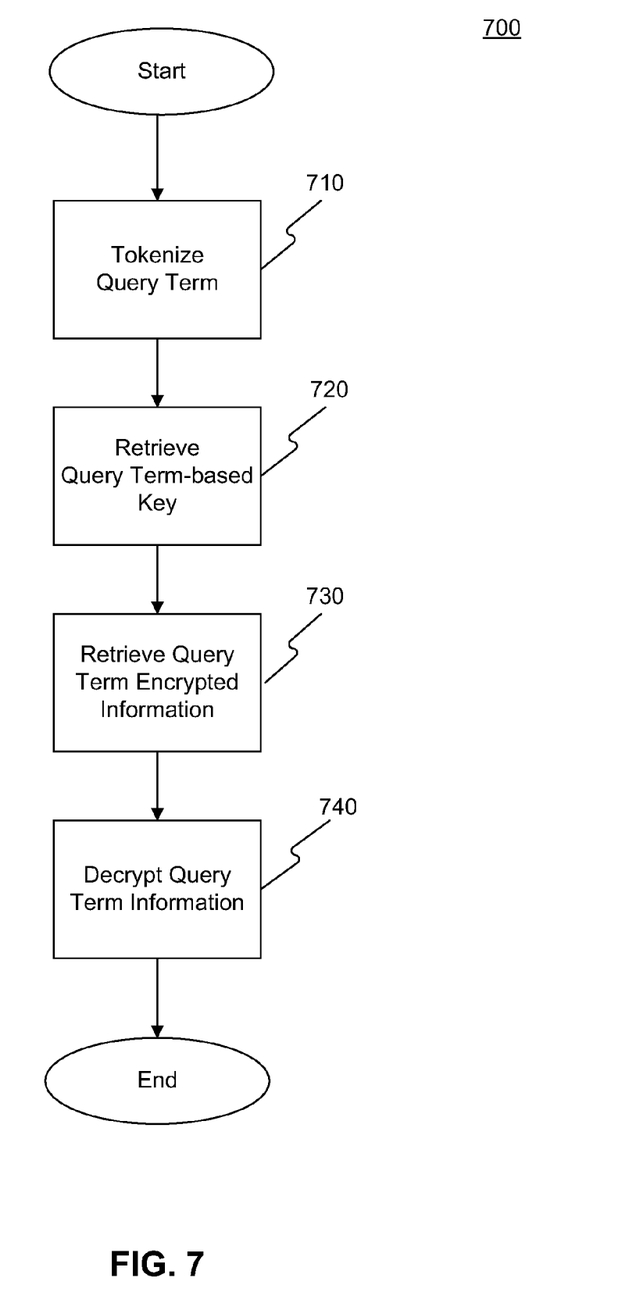
FIG. 7 illustrates an example process that uses privacy preserving techniques to retrieve encrypted information related to a query term and decrypts the information with the key.

FIG. 7 illustrates an example process 700 that uses privacy preserving techniques to find information corresponding to a query term. In step 710, a requester may tokenize the query term via a tokenizing authority. Similar to the process 300 described above, the tokenizing authority may perform a tokenizing function on the submitted query term and return a tokenized string of characters representing the tokenized query term. In some embodiments, further privacy preserving techniques can take place by using a blinding function consistent with the process 500 described above. In step 720, similar to the process 600 described above, the requester may also obtain a decryption key corresponding to the query term by interacting with the tokenizing authority, or a different tokenizing authority or server. Similar to the encryption keys generated in step 620, the decryption key(s) may be calculated from the output of the tokenizing authority rather than provided by the tokenizing authority directly. If the key is retrieved from the tokenizing authority, the key may be returned along with the tokenized query term in step 710. In step 730, the encrypted related query term information is retrieved from the data source or tokenized data holder based on the tokenized query term. Using the decryption key(s), the encrypted related query term information is decrypted in step 740. In some embodiments, multiple keys may be calculated and used to decrypt the related query term information. Generally speaking, if a symmetric-key cryptosystem is employed to encrypt the related query term information in step 640, then the encryption key in step 640 and the decryption key in step 740 will be the same, and can therefore be determined by the same function in steps 620 and 720.

Figure 8:
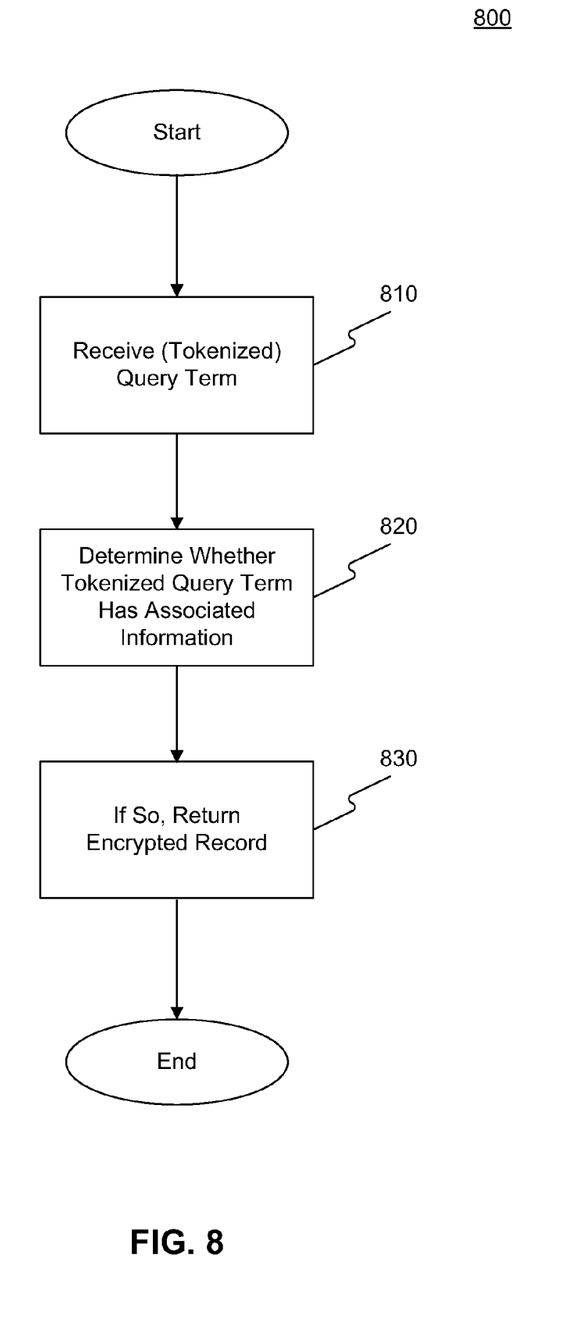
FIG. 8 illustrates an example process that returns an encrypted query term related information record corresponding to a query term.

FIG. 8 illustrates an example process according to another embodiment that returns associated encrypted information corresponding to the query term. In step 810, the requester may interact with the tokenizing authority 130 to calculate the tokenized query term and decryption key corresponding to the query term. The requester may then provide the tokenized query term to the tokenized data holder 140 to determine in step 820 whether associated encrypted information exists for the tokenized query term. If the tokenized data holder determines that associated encrypted information exists, the encrypted record may be returned to the requester in step 830. The requester may use the decryption key from the tokenizing authority to decrypt the information.

The embodiments disclosed above may be monetized by providing the privacy preserving query term service as a fee-based service. In particular, a tokenizing authority and tokenized data holder may provide the data processing and storage as a service. Alternatively, an account may be held with one of these entities which collects the fees and distributes them to the other entities. A service offering privacy preserving data querying may charge requesters on a subscription or per use basis. Alternatively, a third-party account manager may serve as an intermediary between a requester and data source owner. The third-party account manager may serve as an additional abstraction buffer between the privacy conscious requester and data source owner. In the case where the tokenizing authority 140 is trusted, the tokenizing authority 140 may serve as an account manager for the purpose of monetizing privacy preserving data querying. Furthermore, even if monetary gain is not a primary objective, it may be beneficial in terms of preserving privacy for access to the tokenizing authority to be limited to a certain number of transactions per party over a given period of time, to avoid online dictionary attacks. For example, if the tokenized data holder has unlimited access to the tokenizing functionality, then it may be able to determine the query term that a requester is searching for, and/or the query terms provided by the data source owner, by trial and error. With access limits, such types of exhaustive searches may be detected or slowed.

Although the disclosed embodiments above preserve the privacy of data querying for any purpose, some data may be collected and analyzed. For example, the tokenizing authority may log information that a query term was tokenized, log the tokenized query string, and log the calculations and responses as appropriate for analysis later. The tokenized data holder may log the tokenized query terms, a percentage of hits, and whether corresponding encrypted information was requested for a particular tokenized query term. If an account is required by the supporting tokenized data holder or tokenizing authority, the log information can be tied to a particular client organization. The collected data may be provided to the data source owner and correlated and cross-referenced to and lookup requests performed in the clear. Statistical results may also be provided to the information requester. Additionally, trending analysis may be done to determine how many private operations are performed by a single user session.

The embodiments as disclosed herein may be implemented in several example systems that demonstrate the disclosed system of providing private data querying. In some embodiments, the disclosure can be adapted to allow a data query term to be a domain name for possible registration. The potential registrant may use the privacy preserving process to keep the content of the domain name queries private. For example, as applied above, the registrant may blind a domain name, submit it to a tokenizing authority, receive a blinded tokenized domain name, unblind the tokenized domain name, and submit the tokenized domain name to a tokenized data holder which maintains a list of all registered domain names in tokenized format. The tokenized data holder may compare the tokenized domain name to the tokenized list to determine if the domain name has been registered. If not, then the potential registrant may follow up by registering the domain name or may wait without risking of revealing the domain name query to anyone.

In another example, the query term may correspond to a domain name with the purpose of retrieving an encrypted domain name record corresponding to the domain name. The domain name may be submitted to the tokenizing authority to retrieve a tokenized version of the domain name and a decryption key corresponding to the domain name. The tokenized domain name may then be submitted to a tokenized data holder which returns an encrypted record corresponding to the domain name, the record having previously been encrypted when submitted to the tokenized data holder by or on behalf of the data source operator. The requester may then use the decryption key to decrypt the encrypted record.

In another example, the query term may correspond to a uniform resource indicator (URI) that represents a shortened version of a longer URI. The requester may want to preserve the privacy of the short URI by masking the query through tokenization and receiving an encrypted longer URI and decryption key based on the shortened URI (the query term).

Although the foregoing descriptions have generally related to general data queries, it is understood that the methods and systems may also be applied for preserving privacy of queries for specific types of data, such as those presented immediately above. In this understanding, a requester makes queries for availability of or information about a particular type of private data in a data source. Examples of other data types include IP addresses, email addresses, phone numbers, malware attack signatures, trademark strings, and other data types where it is useful to have a way to compare matches among data values, and optionally to convey additional metadata associated with those values, while preserving privacy. For instance, security providers may wish to share with subscribers information about potentially suspicious IP addresses and malware, such that the subscribers only learn that information if they have also arrived at the same suspicion, i.e., if they already know the IP address or malware attack signature. Similarly, merchants may wish to share with web sites the email addresses and phone numbers of their customers, such that the web sites only learn that there is a match if they already know at least some of the information themselves. For example, the email addresses and phone numbers may both be employed separately as query terms, with the corresponding information included as metadata, optionally encrypted. The methods and systems can be applied in such cases as well.

The data source may interact with a tokenizing authority to obtain tokenized versions of its data; the data source may provide the tokenized versions to a tokenized data holder; the requester may also interact with a tokenizing authority to obtain tokenized version of its data; the requester may provide the tokenized versions to the tokenized data holder; and the tokenized data holder may compare the requester's tokenized version to the data source's tokenized version and return the results of the comparison to the requester. In addition, a proxy server may perform one or more of the operations of the data source or data requester. For instance, the data source or data requester may provide a query term to the proxy server, which then acts on behalf of the data source or data requester by interacting with the tokenizing authority and/or tokenized data holder as described herein. The proxy server thus serves as an extension of the data source or data requester. This may be beneficial if the data source or data requester has limited computational capabilities or constraints on its interactions that can be ameliorated by outsourcing operations to the proxy server.

As in the embodiments described above, the interactions may be extended to convey data related to the query (or metadata), which may also be encrypted: The data source's interactions with the tokenizing authority for a given query term may also produce an encryption key; the data source may encrypt metadata values associated with the query term with the encryption key; the data source may provide the encrypted metadata values to the tokenized data holder; the requester's interactions with a tokenizing authority for a given query term may produce a corresponding decryption key; as a result of a successful comparison, the tokenized data holder may provide the encrypted metadata value to the requester; and the requester may decrypt the encrypted metadata value with the encryption key.

The interactions with the tokenizing authority may employ blinding and unblinding operations to preserve privacy of data values, tokenized data values, and encryption keys, relative to the tokenizing authority. They can also employ metering and other access controls to strengthen privacy protections further against attempted compromise by a requester, data source, or other party. In some cases, the functions of more than one actor can be realized by the same party in an actual implementation.

The methods and systems have been generally described in terms of a single instance of each of the actors: data source, requester, tokenizing authority, tokenized data holder. However, it is clear that the methods and systems can also support multiple instances. For instance, more than one requester can interact with the same tokenizing authority and provide tokenized values to be matched by the same tokenized data holder. Likewise, more than one data source can interact with the same tokenizing authority and provide tokenized values to the same tokenized data holder. Thus, a single tokenizing authority and tokenized data holder can enable not just a single requester and data source to preserve the privacy of their queries, but a community of requesters and data sources. The methods and systems thus enable an ecosystem where multiple requesters and data sources can compare matches among data values and convey additional metadata.

Furthermore, because of the intermediation by the tokenizing authority and the tokenized data holder, not only can the privacy of the data values and metadata values be preserved, but also the identities of the requesters and the data sources. In some applications, a data source may prefer not to disclose its identity directly to requesters, but may be willing to do so to an intermediary. The tokenized data holder thus acts a representative of the community of data sources, concealing their actual identities from the requesters, yet still being able to compare values on the requesters' behalf. It likewise acts as a representative of the community of requesters, concealing their identities, yet still being able to compare values and report aggregate results back to the data sources.

Although a single tokenizing function is sufficient to enable multiple requesters and data sources, it may be beneficial to have multiple tokenizing functions. Different tokenizing functions may be employed at different points in time, to reduce concern about the compromise of secret keys associated with the functions. Different functions may be employed for data values of different classifications, which may be based on security attributes, geolocation, or other restrictions. The data source may select one or more tokenizing functions to employ for a given data value based on the classification(s) of the data. Likewise, a requester may select one or more tokenizing functions based on the requester's permissions to access data values of certain classification(s). A requester may thus only learn that its data value matches a data source's data value if the requester has permission for the tokenizing function associated with appropriate classification. Furthermore, different tokenizing functions may be employed for determining encryption or decryption keys depending on metadata classification, and the tokenizing function for determining the tokenized query term may be different than the tokenization function(s) for determining the associated encryption or decryption key(s). Different metadata associated with the same data value may have different classifications and would then be encrypted with different keys. Thus, even if a requester is able to learn that its data value matches a data source's data value, the requester may only obtain associated metadata on a "need-to-know" basis.

The multiple tokenizing functions may be assigned to a single tokenizing authority, or they may be assigned to two or more different tokenizing authorities.

Further, although a single tokenized data holder is sufficient to enable multiple requesters and data sources, it may likewise be beneficial to have multiple tokenized data holders for similar reasons to those just described. Access to different tokenized data holders may similarly be controlled based on classifications and permissions.

In addition to returning an indication of whether a comparison has been successful, and optionally encrypted metadata values, the tokenized data holder may also return, depending on the requester's permission, other information it has about the match. For instance, the tokenized data holder may also return to the requester the number of matches it has seen for the particular tokenized data value (even as it may provide such aggregate results back to the data sources). The number of matches seen may be useful information to the requesters (and data sources), as it gives an indication of what other requesters or data sources are querying. Thus, the response to a requester's query is not limited to matching or metadata, but may include other information that can be provided by the tokenized data holder.

Various enhancements can be employed to strengthen security further using techniques well known in the art. For instance, the tokenizing function and its secret key(s) can be distributed using threshold cryptography across multiple servers, such that at least a designated subset of those servers must participate in the process of computing the function. This reduces concern about the compromise of secret key(s) or key shares stored at any smaller subset of servers.

In some embodiments, a data requester may send a query term to a tokenizing authority to calculate a decryption key for decrypting associated encrypted metadata held by a data store operator. The query term may be submitted without tokenization to the data store to retrieve the encrypted record associated with the query term. The data requester may use the calculated decryption key to decrypt the metadata.

Other embodiments of the disclosure will be apparent to those skilled in the art from consideration of the specification and practice of the embodiments disclosed herein. In particular, it should be appreciated that the processes defined herein are merely examples, and that the steps of the processes need not necessarily be performed in the order presented. It is intended that the specification and example embodiments be considered as examples only, with a true scope and spirit of the embodiments being indicated by the following claims.

What is claimed is:

1. A computer-implemented method for preserving privacy of a query of a data set comprising:
  receiving, at a computer, a client computer request for information from a data set of a tokenized data holder, wherein the request includes a tokenized query term, wherein the tokenized query term was tokenized by a first tokenizing authority computer different from the client computer and from a computer of an owner of the tokenized data holder, and operatively coupled to the client computer and to the tokenized data holder through a network, whereby a requestor does not have access to an entirety of the data set of the tokenized data holder; and determining, via the computer, whether the tokenized query term is contained in the data set, wherein the data set comprises a store of tokenized terms, wherein the tokenized query term corresponds to a tokenized input associated with a query term, whereby the owner of the tokenized data holder does not learn the query term;

wherein the tokenized terms have each been tokenized by a second tokenizing authority computer based on a tokenizing function equivalent to a tokenizing function of the first tokenizing authority, wherein the second tokenizing authority computer is different from the client computer and from a computer of an owner of the tokenized data holder.

2. The method of claim 1, wherein the input is the query term.

3. The method of claim 1, wherein the input is a pre-processed query term.

4. The method of claim 3, wherein the pre-processing includes applying a blinding function.

5. The method of claim 1, wherein the tokenized terms in the store of tokenized terms correspond to tokenized store inputs, wherein at least one tokenized store input is associated with a query term that was pre-processed prior to tokenization.

6. The method of claim 1, comprising:
returning an indication that the tokenized query term is contained in the store of tokenized terms.

7. The method of claim 1, wherein the request is a request for encrypted information associated with a query term corresponding to the tokenized query term.

8. The method of claim 7 comprising:
providing the encrypted information, wherein the encrypted information comprises an encrypted record, wherein the record was encrypted using an encryption key based on a query term associated with the record.

9. The method of claim 8, wherein the encrypted record is decrypted using a decryption key based on the query term associated with the record.

10. A computer-implemented method for preserving privacy of a query of a data set comprising:
receiving, at a first tokenizing authority computer different from a client computer and from a tokenized data holder, and operatively coupled to the client computer and to the tokenized data holder through a network, a client computer request to tokenize a first input corresponding to a first query term;
tokenizing the first input;
transmitting the tokenized first input;
receiving, at a second tokenizing authority computer, a request to tokenize a set of inputs corresponding to a set of query terms, wherein the second tokenizing authority computer is different from the client computer and from a computer of an owner of the tokenized data holder; and
tokenizing the set of inputs to produce a set of tokenized inputs, wherein a set of tokenized terms corresponding to the set of tokenized inputs is stored in the tokenized data holder, whereby a requestor does not have access to an entirety of the data set of the tokenized data holder, and wherein the tokenized data holder is configured to:
receive a tokenized first query term corresponding to the tokenized first input, whereby the owner of the tokenized data holder does not learn the first query term; and
determine whether the tokenized first query term is contained in the set of tokenized terms.

11. The method of claim 10, wherein the first input corresponding to the first query term includes a pre-processing of the first query term, and wherein the pre-processing includes applying a blinding function.

12. The method of claim 10, wherein the tokenized data holder is further configured to:
receive a request for encrypted information associated with the first query term.

13. The method of claim 12 wherein the tokenized data holder is further configured to:
return the encrypted information, wherein the encrypted information comprises an encrypted record, wherein the record was encrypted using an encryption key based on a query term associated with the record.

14. The method of claim 10, wherein the method comprises:
calculating a decryption key based on the first query term.

15. A system for preserving privacy of a query of a data set comprising:
a tokenized data holder server containing a store of tokenized terms, whereby a requestor does not have access to an entirety of the data set of the tokenized data holder; and
a first tokenizing authority server, wherein the first tokenizing authority server is configured to:
receive a client computer input corresponding to a query term, wherein the first tokenizing authority server is different from the client computer and from a computer of an owner of the tokenized data holder server, and operatively coupled to the client computer and to the tokenized data holder server through a network;
perform a tokenizing function on the input; and
transmit the tokenized input; and
wherein the tokenized data holder server is configured to:
receive a tokenized query term corresponding to the tokenized input, wherein the tokenized terms have each been tokenized by a second tokenizing authority server based on a tokenizing function equivalent to that of the first tokenizing authority server, wherein the second tokenizing authority computer is different from the client computer and from a computer of an owner of the tokenized data holder, whereby the owner of the tokenized data holder server does not learn the query term; and
determine if the tokenized query term is contained in the store of tokenized terms.

16. The system of claim 15, wherein the input corresponding to the query term includes a pre-processing of the query term, and wherein the pre-processing includes applying a blinding function.

17. The system of claim 15, wherein the tokenized terms in the store of tokenized terms correspond to tokenized store inputs, wherein at least one tokenized store input is associated with a query term that was blinded prior to tokenization.

18. The system of claim 15, wherein the tokenized data holder server is further configured to:
return an indication that the tokenized query term is contained in the store of tokenized terms.

19. The system of claim 15, wherein the tokenized data holder server is further configured to:
receive a request for encrypted information associated with the tokenized query term.

20. The system of claim 19 wherein the tokenized data holder server is further configured to:
return the encrypted information, wherein the encrypted information comprises an encrypted record, wherein the record was encrypted using an encryption key based on a query term associated with the record.

21. The system of claim 20, wherein the first tokenizing authority server is further configured to:
provide a decryption key based on the query term.

22. A computer-readable medium containing instructions, which, when executed by a processor, perform a method for preserving privacy of a query of a data set, the method comprising:
receiving, at a computer, a client computer request for information from a data set of a tokenized data holder, wherein the request includes at least one tokenized query term that was tokenized by a first tokenizing authority computer different from the client computer and from a computer of an owner of the tokenized data holder, and operatively coupled to the client computer and to the tokenized data holder through a network, wherein the tokenized query term comprises a tokenized input associated with a query term, whereby the owner of the tokenized data holder server does not learn the query term;
determining, via the computer, whether the at least one tokenized query term is contained in the data set, wherein the data set comprises a store of tokenized terms, and wherein the tokenized terms have each been tokenized by a second tokenizing authority computer based on a tokenizing function equivalent to that of the first tokenizing authority computer, wherein the second tokenizing authority computer is different from the client computer and from a computer of an owner of the tokenized data holder, whereby a requestor does not have access to an entirety of the data set of the tokenized data holder.

23. A computer-readable medium containing instructions, which, when executed by a processor, perform a method for preserving privacy of a query of a data set, the method comprising:
receiving, at a first tokenizing authority computer, a client computer request to tokenize a first input corresponding to a first query term, wherein the first tokenizing authority computer is different from the client computer and from a computer of an owner of a tokenized data holder, and operatively coupled to the client computer and to the tokenized data holder through a network;
tokenizing the first input;
transmitting the tokenized first input;
receiving, at a second tokenizing authority computer, a request to tokenize a set of inputs corresponding to a set of query terms, wherein the second tokenizing authority is different from the client computer and from a computer of an owner of the tokenized data holder;
tokenizing the set of inputs to produce a set of tokenized inputs, wherein a set of tokenized terms corresponding to the set of tokenized inputs is stored in the tokenized data holder, wherein the tokenized data holder is configured to:
receive a tokenized first query term corresponding to the tokenized first input, whereby an owner of the tokenized data holder does not learn the first query term; and
determine whether the tokenized first query term is contained in the set of tokenized terms, whereby a requestor does not have access to an entirety of the data set of the tokenized data holder.

* * * * *